(12) United States Patent
Choi et al.

(10) Patent No.: US 10,739,203 B2
(45) Date of Patent: Aug. 11, 2020

(54) MAGNETIC FIELD COMMUNICATION SYSTEM AND METHOD

(71) Applicant: DOOSAN HEAVY INDUSTRIES & CONSTRUCTION CO., LTD., Changwon-si, Gyeongsangnam-do (KR)

(72) Inventors: Jong Min Choi, Yongin-si (KR); Hyun Woo Son, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 275 days.

(21) Appl. No.: 15/921,686

(22) Filed: Mar. 15, 2018

(65) Prior Publication Data

US 2018/0274982 A1    Sep. 27, 2018

(30) Foreign Application Priority Data

Mar. 24, 2017 (KR) .................. 10-2017-0037572

(51) Int. Cl.
*G01K 1/02* (2006.01)
*G01K 13/00* (2006.01)
(Continued)

(52) U.S. Cl.
CPC .............. *G01K 1/024* (2013.01); *F16C 33/00* (2013.01); *F16C 41/00* (2013.01); *G01K 13/00* (2013.01);
(Continued)

(58) Field of Classification Search
CPC ......... G01K 1/024; G01K 13/00; H02J 50/10; H02J 7/025; F16C 33/00; F16C 41/00;
(Continued)

(56) References Cited

U.S. PATENT DOCUMENTS

| 6,199,018 B1 * | 3/2001 | Quist | ................. G01M 13/028 318/806 |
| 9,383,267 B2 * | 7/2016 | Gupta | ....................... G01K 7/38 |

(Continued)

FOREIGN PATENT DOCUMENTS

| DE | 19944652 A1 | 5/2002 |
| EP | 3088790 A1 | 11/2016 |

(Continued)

OTHER PUBLICATIONS

An European Search Report dated Aug. 17, 2018 in connection with European Patent Application No. 18163597.0 which corresponds to the above-referenced U.S. application.

(Continued)

*Primary Examiner* — Lisa M Caputo
*Assistant Examiner* — Philip L Cotey
(74) *Attorney, Agent, or Firm* — Invenstone Patent, LLC

(57) ABSTRACT

A magnetic field communication system and method is devised for communicating a signal indicating an internal state of a bearing through a magnetic field and for converting the signal communicating through the magnetic field into power to analyze the internal state of the bearing. The system includes a sensor unit disposed inside a bearing and an adapter disposed outside the bearing. The sensor unit includes a sensor to detect a temperature of oil inside the bearing and to output a sensing signal indicative of the detected oil temperature, and an interface to convert the outputted sensing signal into a magnetic field signal and to transmit the magnetic field signal outside the bearing. The adapter receives the transmitted magnetic field signal from the sensor unit and analyzes the received magnetic field signal in order to determine a status of the oil temperature.

19 Claims, 5 Drawing Sheets

(51) Int. Cl.
  *F16C 41/00* (2006.01)
  *H02J 7/02* (2016.01)
  *H04B 5/00* (2006.01)
  *H02J 50/10* (2016.01)
  *F16C 33/00* (2006.01)

(52) U.S. Cl.
  CPC ............. *H02J 7/025* (2013.01); *H02J 50/10* (2016.02); *H04B 5/0037* (2013.01); *H04B 5/0075* (2013.01); *F16C 2233/00* (2013.01)

(58) Field of Classification Search
  CPC .. F16C 2233/00; H04B 5/0037; H04B 5/0075
  See application file for complete search history.

(56) References Cited

U.S. PATENT DOCUMENTS

| | | | |
|---|---|---|---|
| 10,018,613 B2* | 7/2018 | Potyrailo | G01N 27/026 |
| 2008/0159674 A1 | 7/2008 | Varonis | |
| 2011/0029156 A1* | 2/2011 | Vernacchia | H04B 5/0031 |
| | | | 701/2 |
| 2015/0168255 A1 | 6/2015 | Hamilton et al. | |
| 2016/0018382 A1* | 1/2016 | Worden | G01N 33/2888 |
| | | | 73/53.05 |
| 2016/0187277 A1* | 6/2016 | Potyrailo | G01N 27/026 |
| | | | 324/633 |
| 2017/0294798 A1* | 10/2017 | Yuk | H02J 7/025 |
| 2018/0159371 A1* | 6/2018 | Kim | H02J 50/12 |

FOREIGN PATENT DOCUMENTS

| | | |
|---|---|---|
| JP | 2003-139155 A | 5/2003 |
| JP | 2004127276 A | 4/2004 |
| JP | 2011-089786 A | 5/2011 |
| KR | 10-2013-0078263 A | 7/2013 |

OTHER PUBLICATIONS

A Korean Office Action dated Nov. 6, 2018 in connection with Korean Patent Application No. 10-2017-0037572 which corresponds to the above-referenced U.S. application.

A Japanese Office Action dated Mar. 22, 2019 in connection with Japanese Patent Application No. 2018-049355 which corresponds to the above-referenced U.S. application.

* cited by examiner

[FIG. 1]
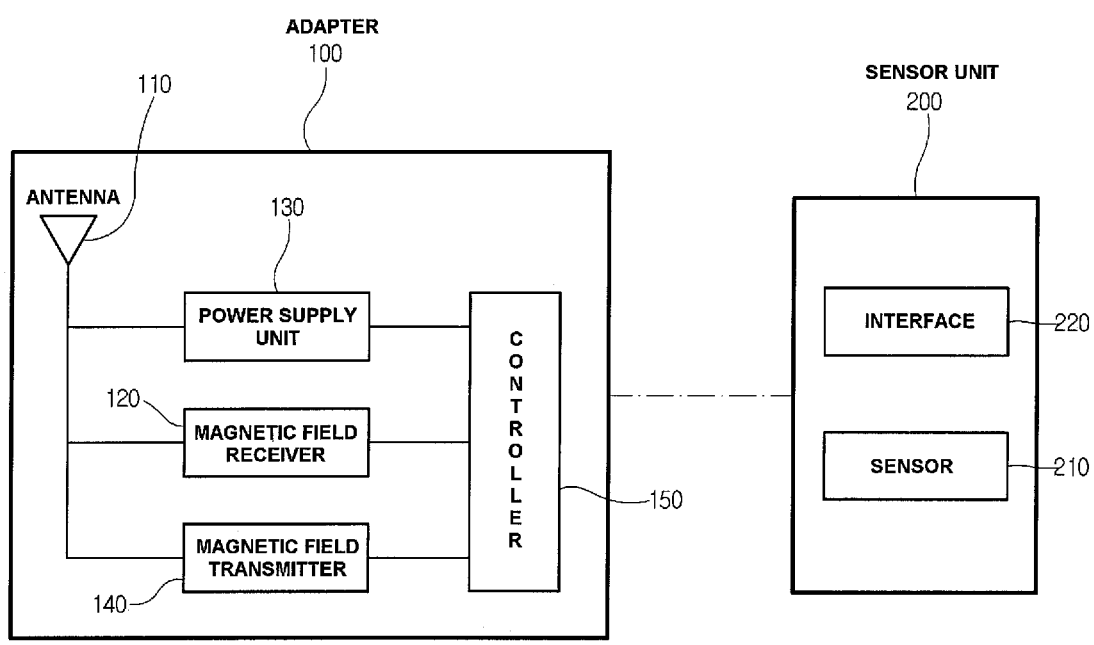

[FIG. 2]
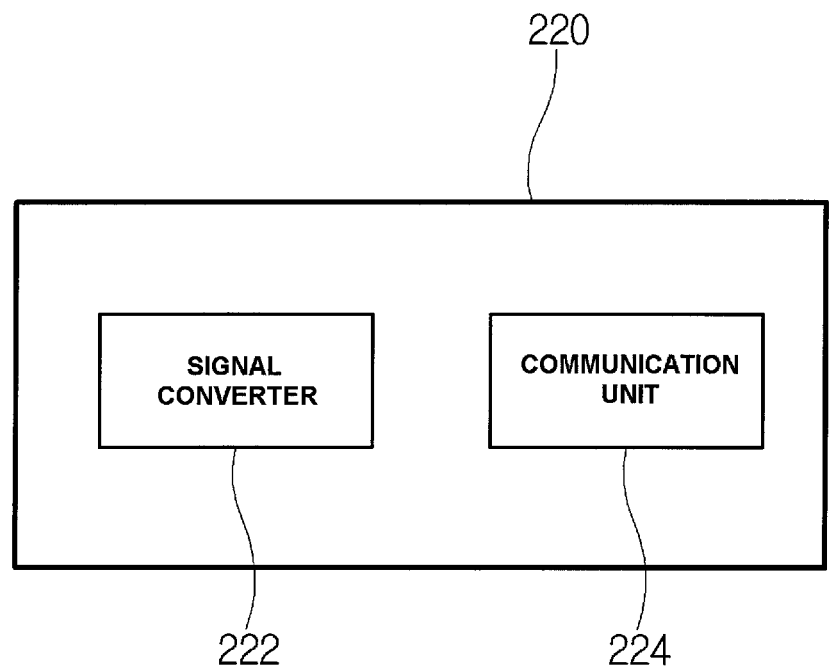

[FIG. 3]
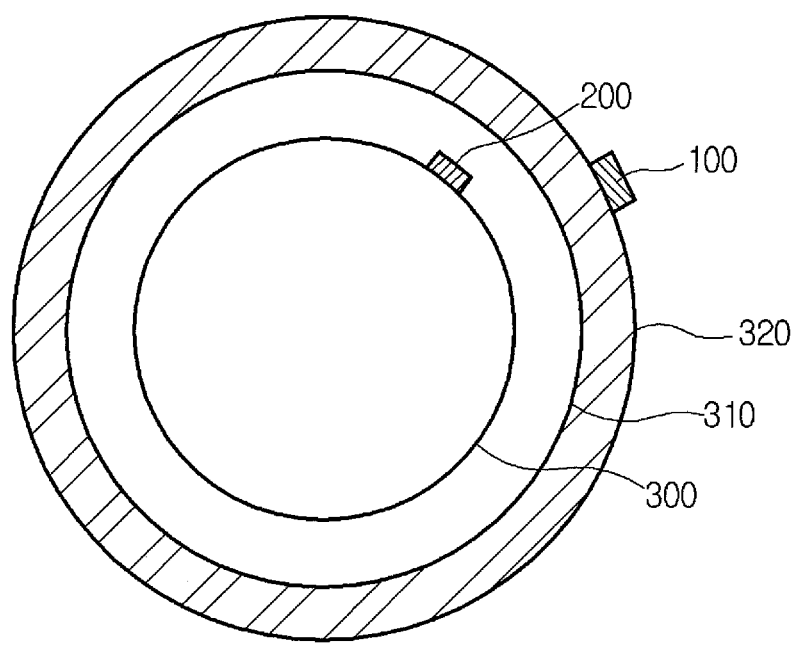

[FIG. 4]
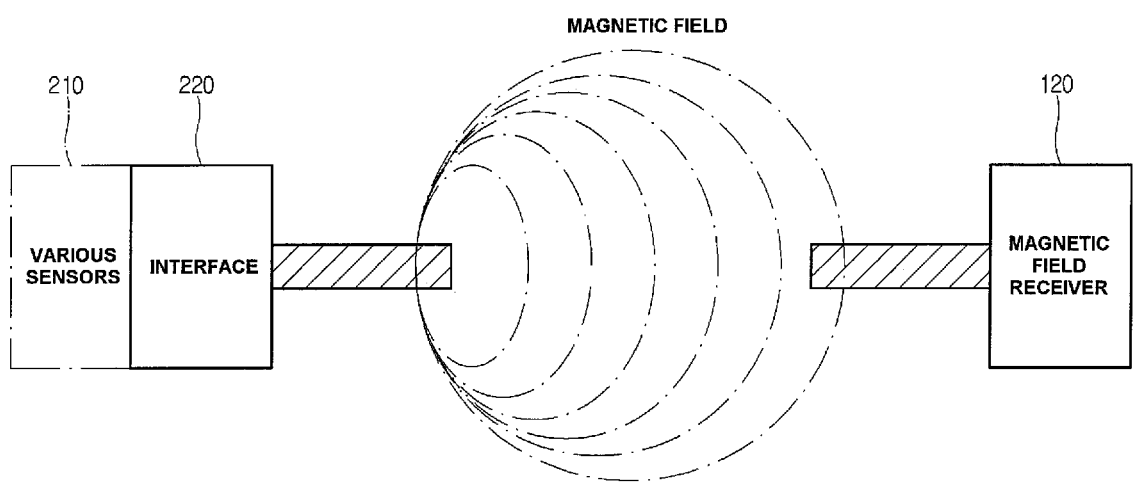

[FIG. 5]
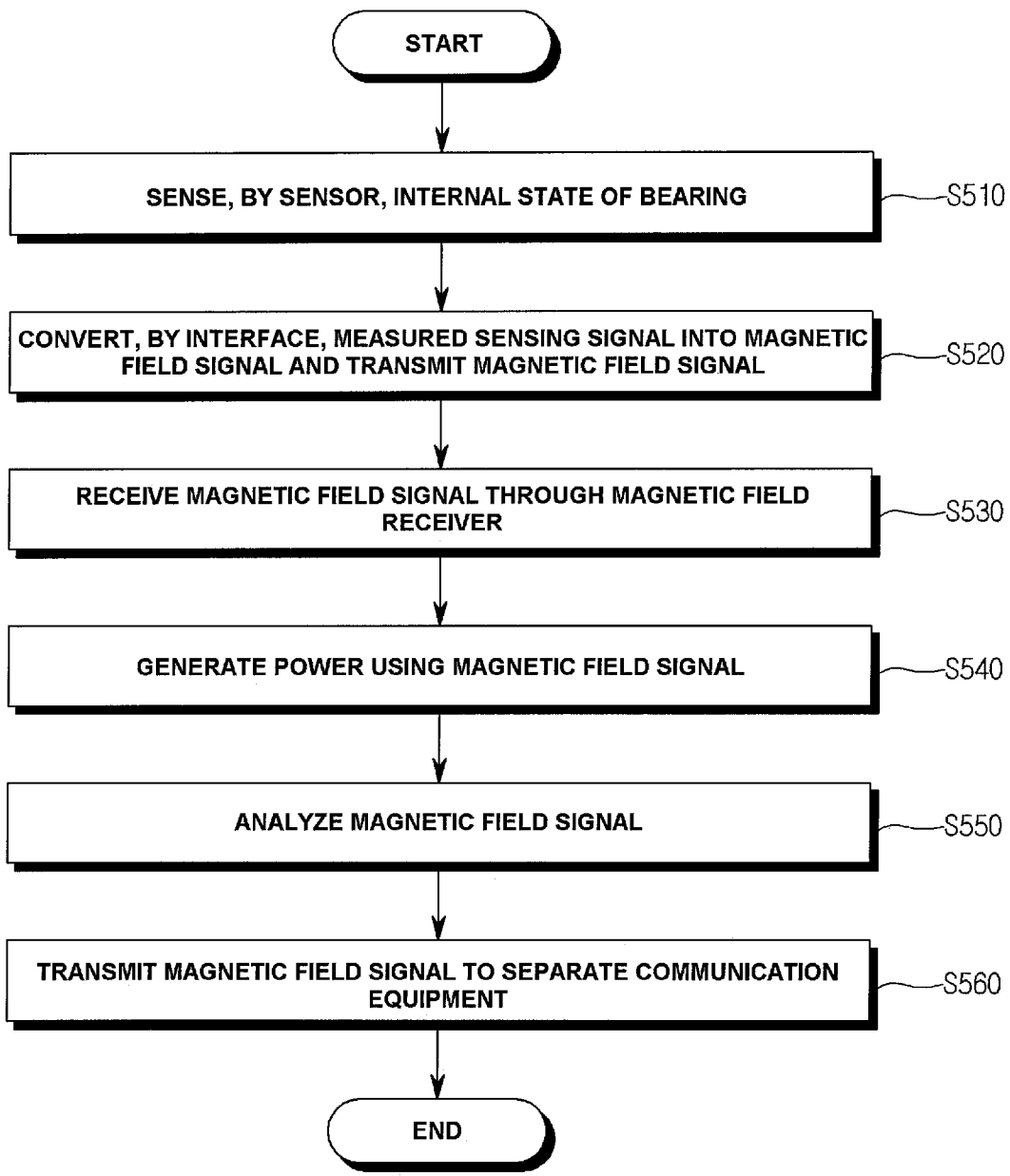

MAGNETIC FIELD COMMUNICATION SYSTEM AND METHOD

CROSS-REFERENCE TO RELATED APPLICATIONS

This application claims priority to Korean Patent Application No. 10-2017-0037572, filed on Mar. 24, 2017, the disclosure of which is incorporated herein by reference in its entirety.

BACKGROUND OF THE INVENTION

Field of the Invention

Exemplary embodiments of the present invention relate to a magnetic field communication system and method, and more particularly, to a magnetic field communication system and method for communicating a signal indicating an internal state of a bearing through a magnetic field and converting the signal communicating through the magnetic field to power to analyze the internal state of the bearing.

Description of the Related Art

In order to sense an internal state of metal equipment, there is a method of predicting the internal state of the metal equipment by sensing an external state of the metal equipment by arranging a sensor outside the metal equipment and then determining the external state of the metal equipment.

This method has a disadvantage in that it is difficult to accurately determine the internal state of the metal equipment and it is difficult to perform an accurate communication of a sensing value of the sensor even if the sensor is disposed inside the metal equipment. In addition, there is the inconvenience of periodically replacing a battery in order to continuously sense the state of the metal equipment.

SUMMARY OF THE INVENTION

An object of the present invention is to provide a magnetic field communication system and method capable of collecting information on an internal state of a bearing of a turbine or a generator.

Another object of the present invention is to provide a magnetic field communication system and method for self-generating power using a magnetic field for checking an internal state of a bearing without replacing a battery.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a magnetic field communication system may include a sensor unit disposed inside a bearing and an adapter disposed outside the bearing. The sensor unit may include a sensor configured to detect a temperature of oil inside the bearing and to output a sensing signal indicative of the detected oil temperature, and an interface configured to convert the outputted sensing signal into a magnetic field signal and to transmit the magnetic field signal outside the bearing. The adapter may be configured to receive the transmitted magnetic field signal from the sensor unit and to analyze the received magnetic field signal in order to determine a status of the oil temperature.

The sensor of the sensor unit may be disposed inside an inner ring of the bearing and may be attached to one of an inner surface of the inner ring and an outer surface of a shaft of the bearing. Thus, the attached sensor may have direct contact with the oil inside the bearing.

The adapter may be disposed on an outer surface of an outer ring of the bearing.

The interface and sensor may be disposed at separate locations inside the bearing.

The adapter may include a magnetic field receiver configured to receive the magnetic field signal and to output a value indicative of the received magnetic field signal; a controller configured to analyze the value from the magnetic field receiver and to determine the status of the internal state of the metal equipment based on the analyzed value; and a power supply unit configured to generate power using the magnetic field signal from the sensor unit and to store the generated power.

The controller may be further configured to monitor the power supply unit to detect a level of stored power present in the power supply unit and to control, based on the detected level, a charging of the power supply unit and the analyzing of the value from the magnetic field receiver. The power supply unit may be configured to be charged using the magnetic field signal from the sensor unit.

The controller may be further configured to control the power supply unit to be charged to at least a first predetermined level using the magnetic field signal, if the detected level drops below a second predetermined level.

The controller may be further configured to use the analyzed value from the magnetic field receiver in order to determine the status of the oil temperature, if the detected level of the stored power is greater than or equal to the first predetermined level. In addition, the controller may be further configured to use the analyzed value from the magnetic field receiver in order to determine the status of the oil temperature, if the detected level of the stored power remains greater than or equal to the second predetermined level after completion of the charging of the power supply unit. In addition, the controller may be further configured to defer or suspend analysis of the received magnetic field signal to determine the status of the oil temperature while the adapter is charging.

The adapter may further include a magnetic field transmitter configured to communicate with a separate communication device using magnetic field communication to transmit information indicative of the determined status of the oil temperature. The separate communication device may include the sensor unit receiving an analyzed magnetic field signal from the adapter.

In accordance with another aspect of the present invention, a magnetic field communication method may include detecting a temperature of oil inside a bearing; outputting a sensing signal indicative of the detected temperature; converting the outputted sensing signal into a magnetic field signal; transmitting the magnetic field signal outside the bearing; receiving the transmitted magnetic field signal; and analyzing the received magnetic field signal in order to determine a status of the oil temperature.

The method may further include generating power using the received magnetic field signal.

The method may further include outputting a value indicative of the received magnetic field signal; and analyzing the outputted value in order to determine the status of the oil temperature.

According to the method, the oil temperature may be detected by a sensor unit disposed inside the bearing, and the transmitted magnetic field signal may be received from the sensor unit by an adapter disposed outside the bearing. In addition, the method may further include generating power using the magnetic field signal from the sensor unit; and storing the generated power in the adapter.

Further according to the method, the adapter may be configured to be charged using the magnetic field signal from the sensor unit. In addition, the method may further include monitoring the stored power to detect a level of stored power present in the adapter, charging the adaptor based on the detected level; and determining the status of the oil temperature based on the detected level.

The method may further include charging the adapter to at least a first predetermined level using the magnetic field signal, if the detected level drops below a second predetermined level.

The method may further include one of analyzing the received magnetic field signal to determine the status of the oil temperature, if the detected level of the stored power is greater than or equal to the first predetermined level; or analyzing the received magnetic field signal to determine the status of the oil temperature, if the detected level of the stored power remains greater than or equal to the second predetermined level after completion of the charging of the adapter.

The method may further include transmitting from the adapter to a separate communication device, information indicative of the determined status of the oil temperature.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a block diagram showing a configuration of a magnetic field communication system according to an embodiment of the present invention;

FIG. 2 is a block diagram showing a configuration of an interface according to an embodiment of the present invention;

FIG. 3 is a diagram showing a bearing inside which a sensor is disposed according to the embodiment of the present invention;

FIG. 4 is a diagram showing the magnetic field communication according to the embodiment of the present invention; and FIG. 5 is a flowchart showing a magnetic field communication method according to the embodiment of the present invention.

DESCRIPTION OF SPECIFIC EMBODIMENTS

Hereinafter, exemplary embodiments of the present invention will be described in detail with reference to the accompanying drawings so that those skilled in the art may easily practice the present invention. As those skilled in the art would realize, the described embodiments may be modified in various different ways, all without departing from the spirit or scope of the present invention.

A part irrelevant to the description will be omitted to clearly describe the present invention, and the same or similar elements will be designated by the same reference numerals throughout the specification.

In addition, throughout the present specification, when any one part is referred to as being "connected to" another part, it means that any one part and another part are "directly connected to" each other or are "electrically connected to" each other with the other part interposed therebetween. Further, unless explicitly described to the contrary, "comprising" any components will be understood to imply the inclusion of other components rather than the exclusion of any other components.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. may be used to describe various portions, components, zones, layers, and/or sections but are not limited thereto. These terms are used only to differentiate any portion, component, zone, layer, or section from other portions, components, zones, layers, or sections. Therefore, a first portion, component, zone, layer, or section which will be described below may be mentioned as a second portion, component, zone, layer, or section without departing from the scope of the present invention.

Terminologies used herein are to mention only a specific exemplary embodiment, and does not intend to limit the present invention. Singular forms used herein include plural forms as long as phrases do not clearly indicate an opposite meaning. A term "including" used in the present specification concretely indicates specific properties, zones, integer numbers, steps, operations, elements, and/or components, and is not to exclude presence or addition of other specific properties, zones, integer numbers, steps, operations, elements and/or components.

The term expressing the relative space of "under", "over", and the like may be used to more easily describe the relationship between other portions of one portion which is illustrated in the drawings. The terms intend to include other meanings or operations of apparatuses which are being used along with the intended meaning in the drawings. For example, overturning the apparatus in the drawings, any portions described as being positioned "under" other portions will be described as being positioned "over" other portions. Therefore, the exemplified term "under" includes both of the up and down directions. An apparatus may rotate by 90° or may rotate at different angles and the term expressing a relative space is interpreted accordingly.

All terms including technical terms and scientific terms used herein have the same meaning as the meaning generally understood by those skilled in the art to which the present invention pertains unless defined otherwise. Terms defined in a generally used dictionary are additionally interpreted as having the meaning matched to the related art document and the currently disclosed contents and are not interpreted as ideal or formal meaning unless defined.

Hereinafter, exemplary embodiments of the present invention so as to be easily practiced by a person skilled in the art to which the present invention pertains will be described in detail with reference to the accompanying drawings. However, the present disclosure may be modified in various different ways and is not limited to embodiments provided in the present description.

FIG. 1 shows a configuration of a magnetic field communication system according to an embodiment of the present invention, and FIG. 2 shows a configuration of the interface shown in FIG. 1.

Referring to FIGS. 1 and 2, a magnetic field communication system according to the embodiment may include an adapter 100 and a sensor unit 200. The adapter 100 may include an antenna 110, a magnetic field receiver 120, a power supply unit 130, a magnetic field transmitter 140, and a controller 150. The sensor unit 200 may include a sensor 210 and an interface 220. The sensor 210 may be realized in the form of a transducer.

The sensor 210 may be disposed inside a bearing to measure a temperature of oil inside the bearing. Specifically, the sensor 210 may be disposed inside an inner ring 310 of the bearing, and contact an outer surface of a shaft 300 of the bearing to measure the temperature of the oil inside the bearing.

The interface 220 may convert a sensing signal for the temperature of the oil measured by the sensor 210 into a magnetic field signal. Specifically, the interface 220 may be disposed at the same position as the sensor inside the bearing. Thus disposed, the interface 220 may convert the sensing signal for the temperature of the oil measured by the sensor 210 into the magnetic field signal and transmit the magnetic field signal outside the bearing. For example, the interface 220 may be disposed inside the bearing as a component separate from the sensor 210. As another example, the interface 220 may be one component of the sensor 210.

The interface 220 may include a signal converter 222 and a communication unit 224. The signal converter 222 may convert the sensing signal for the temperature of the oil inside the bearing, which is measured by the sensor 210, into the magnetic field signal. The communication unit 224 may transmit the magnetic field signal outside the bearing.

The antenna 110 may receive the magnetic field signal transmitted from the interface 220 and may transmit the received magnetic field signal to the magnetic field receiver 120 and to the power supply unit 130.

Here, in the magnetic field communication between the interface 220 and the adapter 100, the interface 220 and the adapter 100 may be set to have the same resonance frequency, so that the maximum power can be transmitted. Further, a distance between and relative positions of the interface 220 and the adapter 100 may be predetermined so that the maximum power can be transmitted.

The magnetic field receiver 120 of the adapter 100 may receive the magnetic field signal transmitted from the interface 220 through the antenna 110 and may provide the received magnetic field signal to the controller 150. In particular, the magnetic field receiver 120 may output to the controller 150 a value indicative of the received magnetic field signal, which reflects the detected internal state of the bearing, namely, the temperature of the oil.

The power supply unit 130 may generate power using the magnetic field signal supplied from the sensor unit 200 and may store the generated power. Specifically, the power supply unit 130 may include a coil (not shown) capable of generating a current when the magnetic field is applied and a capacitor (not shown) capable of storing the generated current. When receiving the magnetic field signal, the power supply unit 130 may store a current, which is generated by an electromagnetic induction phenomenon caused by the magnetic field, in the capacitor. Here, the capacitor may use the current stored in the capacitor as a power source, if current is no longer supplied from the coil. Accordingly, if the magnetic field signal is supplied from the sensor unit 200, the power supply unit 130 may be controlled by the controller 150 to store in the capacitor the current generated in the coil by the magnetic field signal, and if the magnetic field signal is not thus supplied and therefore the coil current is no longer be supplied to the capacitor, the power supply unit 130 may use the current stored in the capacitor as the power source.

The controller 150 may control the supply of the magnetic field signal received by the magnetic field receiver 120 to the power supply unit 130 and analyze the received magnetic field signal. Specifically, the controller 150 may control the supply the magnetic field signal based on a level of stored power. Here, the controller 150 may monitor the power supply unit 130, continuously or periodically, to detect a level of the power stored in the power supply unit 130, and accordingly, may control, based on the detected level, a charging of the power supply unit 130 and the analyzing of the value from the magnetic field receiver 120.

Under control of the controller 150, the magnetic field signal may be supplied to the power supply unit 130 until the power level of the power supply unit 130 becomes greater than or equal to a first predetermined level, when the power supply unit 130 stops being charged. The controller 150 may defer or suspend analysis of the magnetic field signal until the power level of the power supply unit 130 becomes greater than or equal to the first predetermined level. At this time, the power supply unit 130 may generate power using the magnetic field signal supplied from the sensor unit 200 and store the generated power. For example, the first predetermined level may be the power level at which the charging of the power supply unit 130 is completed, which be a level at or near the capacity of the power supply unit 130, or may be a power level sufficient to render an accurate analysis of the magnetic field signal, even if the charging of the power supply unit 130 is not completed.

If the level of the power charged in the power supply unit 130 is greater than or equal to the first predetermined level, the controller 150 may control the power supply unit 130 so that the magnetic field signal is no longer charging the power supply unit 130, and may then analyze the magnetic field signal to determine the internal state (e.g., oil temperature) of the bearing. At this time, the controller 150 may receive power from the power supply unit 130 to analyze the internal state of the bearing.

In addition, the controller 150 may again control the supply of the magnetic field signal to the power supply unit 130 when, after the charging of the power supply unit 130 is completed, the power stored in the power supply unit 130 is reduced to a second predetermined level or less. At this time, the controller 150 may not use the magnetic field signals for the analysis of the internal state of the bearing and instead may cause the supply of the magnetic field signal to charge the power supply unit 130 to generate power. For example, the second predetermined level may be a power level in which the power stored in the power supply unit 130 is completely discharged, or may be a power level that is not enough to analyze the magnetic field signal, even if the power stored in the power supply unit 130 is not completely discharged.

Here, the controller 150 may control the supply the magnetic field signal so that the level of the power stored in the power supply unit 130 is greater than or equal to the first predetermined level. If the level of the power stored in the power supply unit 130 is greater than or equal to the first predetermined level, the controller 150 may use the stored power to analyze the magnetic field signal received by the magnetic field receiver 120. In addition, if the level of the power stored in the power supply unit 130 is reduced to the second predetermined level or less, the controller 150 may again control supply of the magnetic field signal to the power supply unit 130. That is, the controller 150 may determine the internal state of the bearing without using a separate power supply device. The controller 150 may provide the analysis result of the magnetic field signal to the magnetic field transmitter 140.

The magnetic field transmitter 140 may transmit the result of the magnetic field signal analyzed by the controller 150 to a separate communication device (not shown). In other words, the magnetic field transmitter 140 may communicate with the separate communication device by transmitting information indicative of the determined status of the internal state of the bearing. At this time, the magnetic field transmitter 140 transmits the analyzed magnetic field signal to the separate communication device using magnetic field communication, and the separate communication device may be the sensor unit 200 or a device other than the sensor unit 200.

The magnetic field communication system according to the embodiment of the present invention adopts a communication method using the magnetic field, and as a result, may perform communication between an inside and an outside of a bearing or other metal equipment, to include an underground or underwater facility, in an environment where a general communication system is difficult to employ. In addition, the magnetic field communication system according to the embodiment of the present invention may not require the separate power supply device, and therefore may simplify the configuration of a communication system. As the configuration is simplified, the adapter 100 may be provided in an area having a narrow space.

FIG. 3 shows the sensor unit 200 disposed inside the bearing and the adapter 100 disposed outside the bearing. Referring to FIG. 3, the bearing may be configured to include an inner ring 310 and an outer ring 320 disposed around a shaft 300.

Conventionally, in order to measure the temperature of the oil inside the bearing, a sensor unit is typically attached to the outer ring 320 to predict the temperature inside the bearing. Generally, the oil is provided between the shaft 300 and the inner ring 310 of the bearing. In order to measure the temperature of the oil, the conventional method measures the temperature of the outer ring 320 of the bearing, which is made of metal, and the temperature of the oil inside is predicted. However, when the temperature of the oil is measured by the conventional method, there is a problem in that the predicted temperature of the oil differs from the actual temperature of the oil. In addition, when an electrically communicating sensor (not shown) is disposed inside the bearing, it is difficult to communicate with a device disposed outside the bearing, through the outer ring 320 of the bearing made of thick metal.

According to the embodiment of the present invention, the temperature of the oil inside the bearing may be measured by the sensor unit 200 attached to the shaft 300 or the inner ring 310 of the bearing. The sensor unit 200, which may include both the sensor 210 and interface 220, may be made of a material that is not damaged even when in direct contact with high-temperature oil.

The sensor 210 may be disposed to be in contact with an outer surface of the shaft 300 of the bearing or disposed on an inner surface of the inner ring 310 of the bearing to directly measure the temperature of the oil. Thus, in either case, the sensor 210 of the sensor unit 200 is disposed inside the inner ring 310 of the bearing, such that the attached sensor 210 has direct contact with the oil inside the bearing. Meanwhile, the adapter 100 may be disposed on an outer surface of the outer ring 320 of the bearing.

In one example, the interface 220 may be disposed inside the bearing as component separate from the sensor 210, that is, at a location separate from that of the sensor 210. As another example, the interface 220 may be one component of the sensor 210, whereby the interface 220 and sensor 210 are formed into one, unified component. The interface 220 may transmit the sensing signal for the temperature of the oil inside the bearing, which is measured by the sensor 210, to the outside of the bearing. The interface 220, disposed together with the sensor 210, communicates the temperature of the oil inside the bearing, which is directly measured by the sensor 210, with the outside through the magnetic field. In addition, a delay time for predicting the temperature of the oil inside the bearing may be shortened, thereby shortening the starting time of a turbine and a generator.

Referring to FIG. 4, showing the magnetic field communication of the present embodiment, the sensor 210 may measure the internal state of the bearing, and the interface 220 may convert the sensing signal indicating the internal state of the bearing being measured by the sensor 210 into a magnetic field signal. In addition, the interface 220 may transmit the magnetic field signal to the magnetic field receiver 120 through the magnetic field. The interface 220 may include a separate passive element for impedance matching with the adapter 100. Here, the antenna 110 may receive the magnetic field signal transmitted from the interface 220 and transmit the received magnetic field signal to the magnetic field receiver 120. At this time, the antenna 110 may also transmit the received magnetic field signal to the power supply unit 130 of the adapter 100 for charging purposes.

In the magnetic field communication between the interface 220 and the magnetic field receiver 120, the interface 220 and the magnetic field receiver 120 may be set to have the same resonance frequency, and the distance between and relative positions of the interface 220 and the magnetic field receiver 120 may be predetermined so that maximum power may be transmitted. That is, the reception performance of the magnetic field communication may be improved through impedance matching between the adapter 100 and the sensor unit 200.

FIG. 5 shows a magnetic field communication method according to an embodiment of the present invention. A redundant description of overlapping contents will be omitted for the simplicity of explanation.

Referring to FIG. 5, the sensor 210 may sense the internal state of the bearing (S510). Specifically, the sensor 210 may be disposed to be in contact with an outer surface of the shaft 300 of the bearing or disposed on the inner ring 310 of the bearing to directly measure the temperature of the oil inside the bearing.

Next, the interface 220 may convert the sensing signal sensed by the sensor 210 into the magnetic field signal and transmit the magnetic field signal (S520).

Specifically, the interface 220 may be disposed at the same position as a separate component from the sensor 210 inside the bearing, or may be one component of the sensor 210. In addition, the interface 220 may include a signal converter 222 and a communication unit 224. The signal converter 222 converts the sensing signal sensed by the sensor 210 into the magnetic field signal, and the communication unit 224 may transmit the converted magnetic field signal the outside the bearing. At this time, the communication unit 224 may transmit the magnetic field signal through the magnetic field.

Next, the magnetic field receiver 120 may receive the magnetic field signal transmitted from the interface 220 (S530). Here, the magnetic field receiver 120 may provide the received magnetic field signal to the controller 150.

Next, the power supply unit 130 may generate power by receiving the magnetic field signal from the sensing unit 200 (S540).

Specifically, when the power supply unit 130 is not charged, or not charged sufficiently, the controller 150 may control the supply of the magnetic field signal to the power supply unit 130, and thereby cause the magnetic field signal present in the adapter 100 to charge the power supply unit 130. The power supply unit 130 may generate power using the received magnetic field signal and store the generated power. Here, the power supply unit 130 stores a current generated by the electromagnetic induction phenomenon caused by the magnetic field, and the generated current may be stored in the capacitor.

Next, the controller 150 may analyze the magnetic field signal using an electric signal (current) stored in the power supply unit 130 as a power source (S550).

Specifically, if the level of the power stored in the power supply unit 130 is greater than or equal to the first predetermined level, the controller 150 may no longer cause the supply of the magnetic field signal to charge the power supply unit 130 and may instead analyze the magnetic field signal. Here, the controller 150 may determine the internal state of the bearing by analyzing the magnetic field signal. As an example, it is possible to determine whether the temperature inside the bearing is normal temperature or abnormal temperature by detecting the temperature inside the bearing.

Here, if the level of the power stored in the power supply unit 130 which was greater than or equal to the first predetermined level is reduced to the second predetermined level or less, the controller 150 may apply the magnetic field signal so that the level of power stored in the power supply unit 130 is greater than or equal to the first predetermined level again.

Next, the magnetic field transmitter 140 may transmit the magnetic field signal analyzed by the controller 150 to a separate communication device or equipment (S560). Specifically, the magnetic field transmitter 140 may transmit the internal state of the bearing, which is determined through the magnetic field signal, to the separate communication device. At this time, the magnetic field transmitter 140 may transmit the magnetic field signal to the separate communication device using magnetic field communication, and the separate communication device may be the sensor unit 200.

According to the embodiment of the present invention, it is possible to realize the magnetic field communication system and method for communicating the signal indicating the internal state of the bearing through the magnetic field and converting the signal communicating through the magnetic field into power to analyze the internal state of the bearing.

The magnetic field communication system and method according to the embodiment of the present invention can collect status information on the temperature of the oil inside a bearing, or in environments where it is difficult to sense the inside of a metal body or similar structure.

In addition, it is possible to self-generate power using a magnetic field to check the internal state of the bearing without replacing the battery, and it is possible to simplify the configuration of the communication system since no separate battery is required.

In addition, other features and advantages of the present invention may be newly understood through the embodiments of the present invention.

Those skilled in the art will appreciate that since various modifications and alterations may be made without departing from the spirit or essential feature of the present invention, the above-mentioned embodiments are not restrictive but are exemplary in all aspects. It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. A magnetic field communication system, comprising:
    a sensor unit disposed inside a bearing, the bearing including inner and outer rings surrounding a shaft, the sensor unit including:
        a sensor disposed inside the inner ring of the bearing and attached to an outer surface of the shaft to detect a temperature of oil inside the bearing, the sensor configured to output a sensing signal indicative of the detected oil temperature, and
        an interface configured to convert the outputted sensing signal into a magnetic field signal and to transmit the magnetic field signal outside the bearing; and
    an adapter disposed on an outer surface of the outer ring of the bearing and configured to receive the transmitted magnetic field signal from the sensor unit and to analyze the received magnetic field signal in order to determine a status of the oil temperature.

2. The magnetic field communication system of claim 1, wherein the attached sensor has direct contact with the oil inside the bearing.

3. The magnetic field communication system of claim 1, wherein the interface and sensor are disposed at separate locations inside the bearing.

4. The magnetic field communication system of claim 1, wherein the adapter includes:
    a magnetic field receiver configured to receive the magnetic field signal and to output a value indicative of the received magnetic field signal;
    a controller configured to analyze the value from the magnetic field receiver and to determine the status of the oil temperature inside the bearing based on the analyzed value; and
    a power supply unit configured to generate power using the magnetic field signal from the sensor unit and to store the generated power.

5. The magnetic field communication system of claim 4, wherein the controller is further configured to monitor the power supply unit to detect a level of stored power present in the power supply unit and to control, based on the detected level, a charging of the power supply unit and the analyzing of the value from the magnetic field receiver, and
    wherein the power supply unit is configured to be charged using the magnetic field signal from the sensor unit.

6. The magnetic field communication system of claim 5, wherein the controller is further configured to control the power supply unit to be charged to at least a first predetermined level using the magnetic field signal, if the detected level drops below a second predetermined level.

7. The magnetic field communication system of claim 6, wherein the controller is further configured to use the analyzed value from the magnetic field receiver in order to determine the status of the oil temperature, if the detected level of the stored power is greater than or equal to the first predetermined level, and to not analyze the received magnetic field signal to determine the status of the oil temperature while the adapter is charging.

8. The magnetic field communication system of claim 6, wherein the controller is further configured to use the analyzed value from the magnetic field receiver in order to determine the status of the oil temperature, if the detected level of the stored power remains greater than or equal to the second predetermined level after completion of the charging of the power supply unit, and to not analyze the received magnetic field signal to determine the status of the oil temperature while the adapter is charging.

9. The magnetic field communication system of claim 1, wherein the adapter further includes:
   a magnetic field transmitter configured to communicate with a separate communication device using magnetic field communication to transmit information indicative of the determined status of the oil temperature.

10. The magnetic field communication system of claim 9, wherein the separate communication device includes the sensor unit receiving an analyzed magnetic field signal from the adapter.

11. A magnetic field communication method, comprising:
   detecting a temperature of oil inside a bearing including inner and outer rings surrounding a shaft;
   outputting a sensing signal indicative of the detected temperature;
   converting the outputted sensing signal into a magnetic field signal;
   transmitting the magnetic field signal outside the bearing;
   receiving the transmitted magnetic field signal; and
   analyzing the received magnetic field signal in order to determine a status of the oil temperature,
   wherein the oil temperature is detected by a sensor unit disposed inside the inner ring of the bearing and attached to an outer surface of the shaft, and
   wherein the transmitted magnetic field signal is received from the sensor unit by an adapter disposed on an outer surface of the outer ring of the bearing.

12. The magnetic field communication method of claim 11, further comprising:
   generating power using the received magnetic field signal.

13. The magnetic field communication method of claim 11, further comprising:
   outputting a value indicative of the received magnetic field signal; and
   analyzing the outputted value in order to determine the status of the oil temperature.

14. The magnetic field communication method of claim 11, the method further comprising:
   generating power using the magnetic field signal from the sensor unit; and
   storing the generated power in the adapter.

15. The magnetic field communication method of claim 14, wherein the adapter is configured to be charged using the magnetic field signal from the sensor unit, the method further comprising:
   monitoring the stored power to detect a level of stored power present in the adapter,
   charging the adaptor based on the detected level; and
   determining the status of the oil temperature based on the detected level.

16. The magnetic field communication method of claim 15, further comprising:
   charging the adapter to at least a first predetermined level using the magnetic field signal, if the detected level drops below a second predetermined level.

17. The magnetic field communication method of claim 16, further comprising:
   analyzing the received magnetic field signal to determine the status of the oil temperature, if the detected level of the stored power is greater than or equal to the first predetermined level,
   wherein the received magnetic field signal is not analyzed to determine the status of the oil temperature while the adapter is charging.

18. The magnetic field communication method of claim 16, further comprising:
   analyzing the received magnetic field signal to determine the status of the oil temperature, if the detected level of the stored power remains greater than or equal to the second predetermined level after completion of the charging of the adapter,
   wherein the received magnetic field signal is not analyzed to determine the status of the oil temperature while the adapter is charging.

19. The magnetic field communication method of claim 11, further comprising:
   transmitting, from the adapter to a separate communication device, information indicative of the determined status of the oil temperature.

* * * * *